Figure 1:
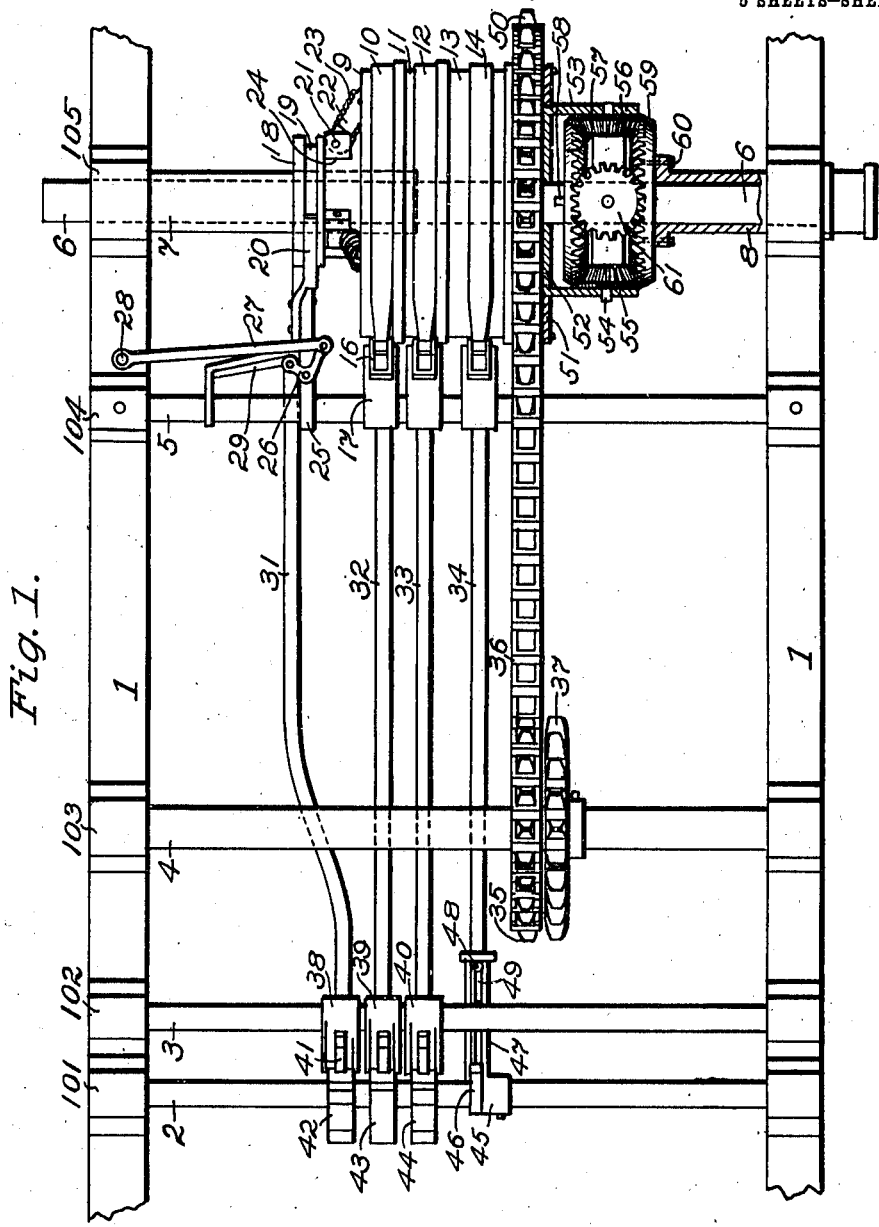

D. K. WILSON.
POWER TRANSMISSION DEVICE.
APPLICATION FILED AUG. 26, 1910.

1,021,030.

Patented Mar. 26, 1912.

5 SHEETS—SHEET 1.

Witnesses:
O. D. Young
Leta Crabtree

Inventor.
D. K. Wilson.
by
G. C. Kennedy.
Attorney.

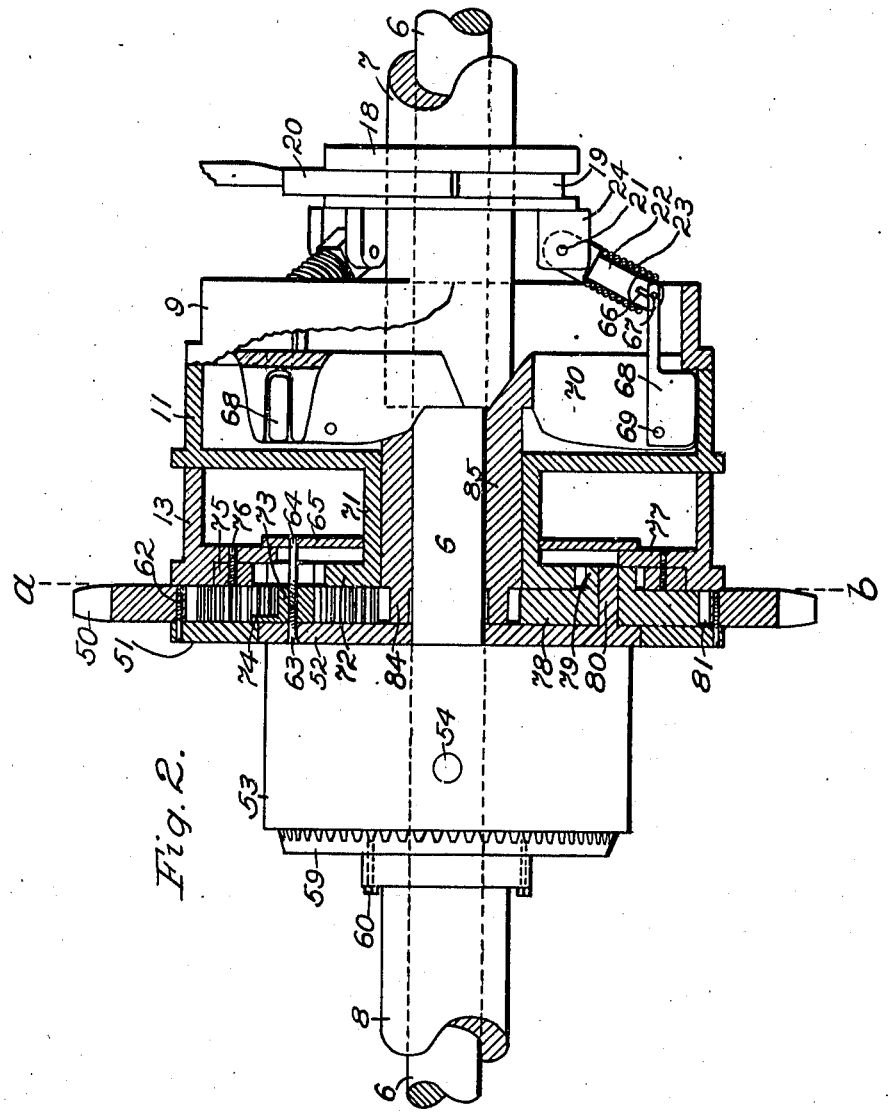

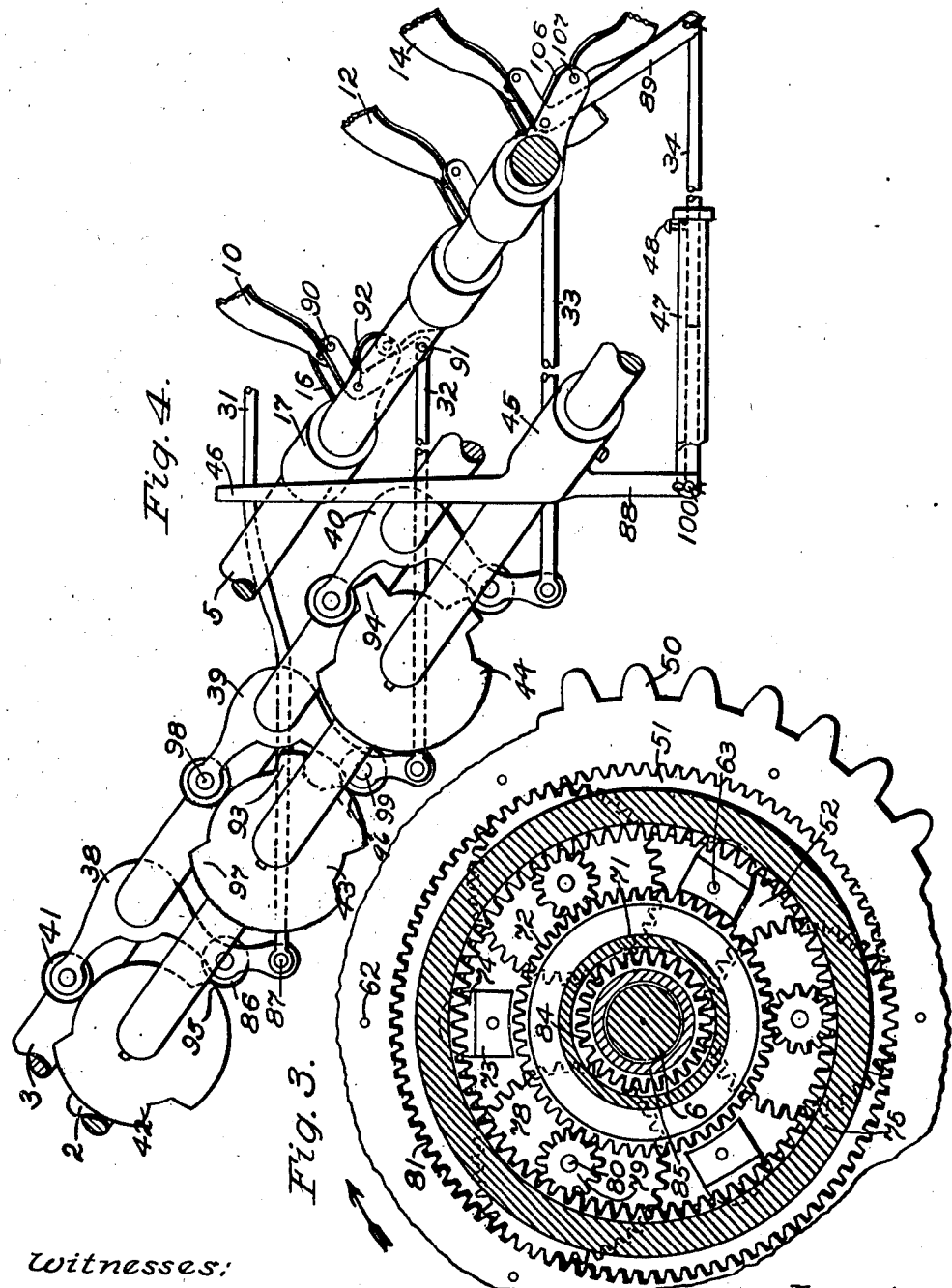

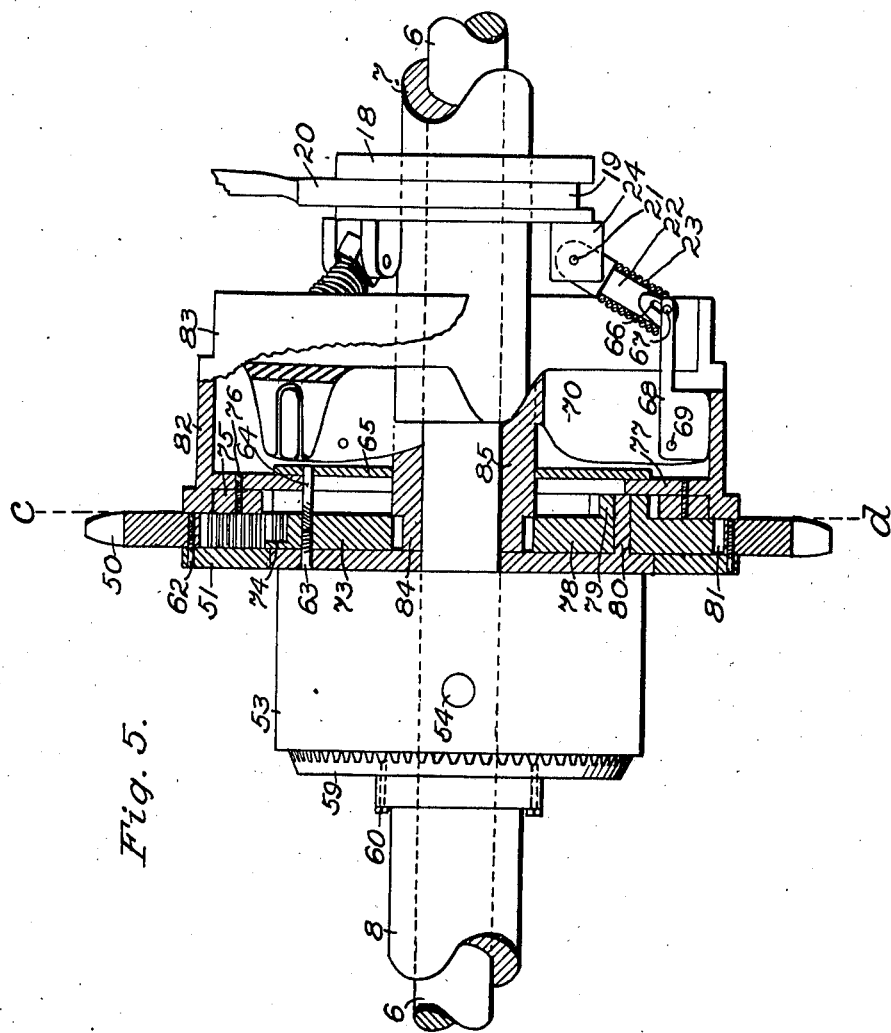

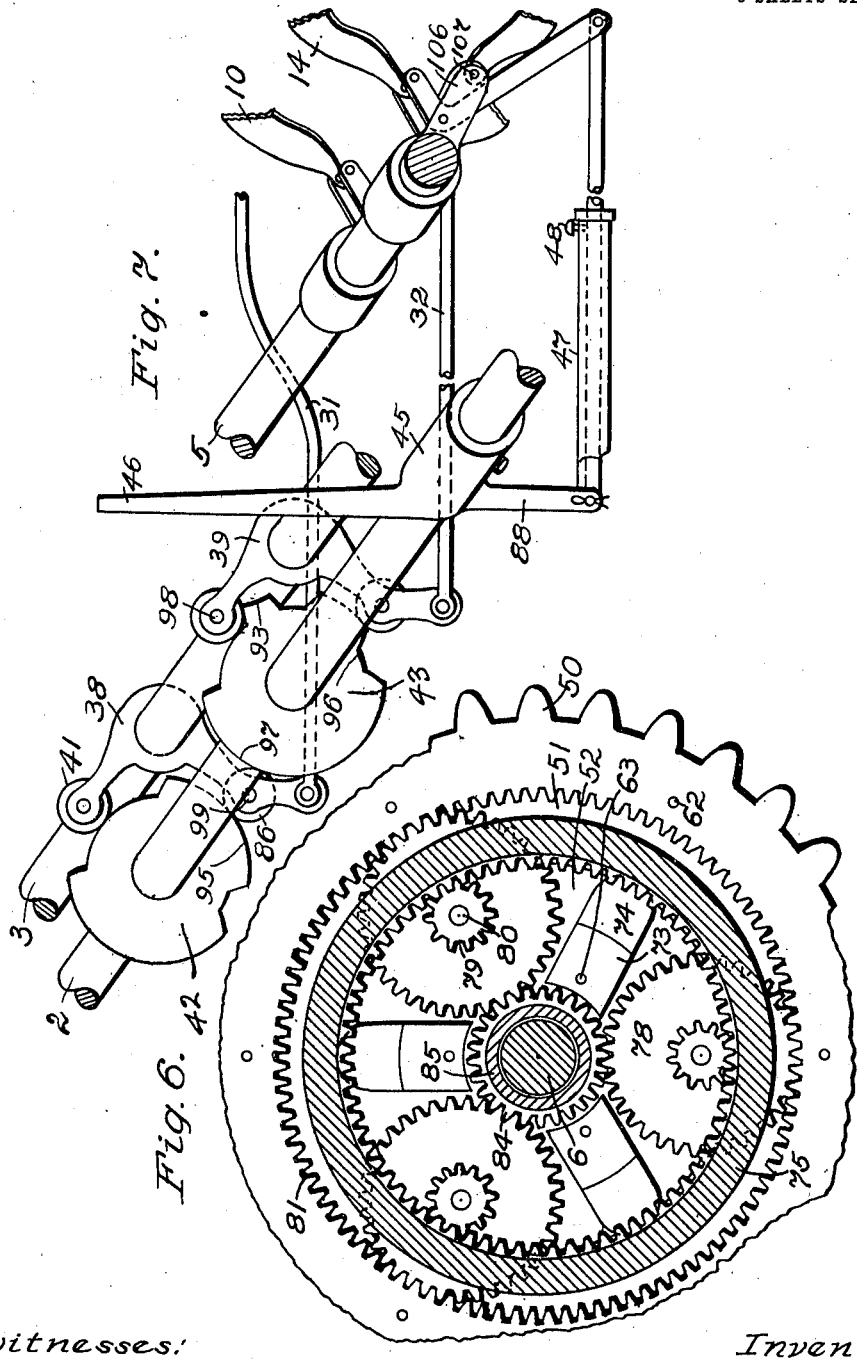

UNITED STATES PATENT OFFICE.

DALTON K. WILSON, OF WATERLOO, IOWA, ASSIGNOR TO WILLIAM GALLOWAY COMPANY, OF WATERLOO, IOWA.

POWER-TRANSMISSION DEVICE.

1,021,030.          Specification of Letters Patent.      Patented Mar. 26, 1912.

Application filed August 26, 1910. Serial No. 579,061.

*To all whom it may concern:*

Be it known that I, DALTON K. WILSON, a citizen of the United States of America, and a resident of Waterloo, Blackhawk county, Iowa, have invented certain new and useful Improvements in Power-Transmission Devices, of which the following is a specification.

My invention relates to improvements in power transmission devices, and the object of my improvements is to provide for a motor vehicle a positive change-speed and reversible transmission device, which is convenient, responsive and efficient in use, and which is adapted for employment in either passenger or freight-carrying machines, but is also practical as a part of the driving-mechanism of implement tractors. This object I have accomplished by the mechanism which is hereinafter described and claimed, and which is illustrated in the accompanying drawings, in which:

Figure 1 is an upper plan view of my power transmission device, parts being sectioned away. Fig. 2 is an enlarged longitudinal central axial section of the friction-drums. Fig. 3 is a transverse section of said device taken along the line *a—b* of Fig. 2. Fig. 4 is a diagrammatic view of the speed-changing cams and their connections to the band-brakes of said friction-drums. Fig. 5 is a longitudinal central axial view of the friction-drums of a power transmission device constructed according to the principles of my invention but having but two forward changes of speed. Fig. 6 is a transverse section of the device shown in Fig. 5, taken along the line *c—d* thereof. Fig. 7 is a diagrammatic view of the change-speed cams used in connection with the drums shown in Fig. 5.

Similiar characters of reference designate corresponding parts throughout the several views.

Figs. 1 to 4 inclusive show the construction of my device when arranged for three changes of speed in forward movement, and is intended especially for use as a part of the driving mechanism of automobiles used for passenger or freight carrying, while the two-speed device shown in Figs. 5 to 7 inclusive is adapted for use in traction-engines or tractors.

The side-bars 1 of the frame carry the bearings 101, 102, 103, 104 and 105 in which are respectively mounted the ends of the shafts 2, 3, 4, 5 and 6, all said shafts being rotatable except the shaft 5 which is fixed in its bearings. The ends of the shaft 6 are incased in sleeves 7 and 8 placed oppositely, seated in said bearings 105, and said shaft and sleeves are relatively movable.

The shaft 4 carries two sprocket-wheels 35 and 37, of which the wheel 37 is driven by a sprocket-chain (not shown) driven by some suitable source of power. A sprocket-chain 36 is seated about the other sprocket-wheel 35 and also about a sprocket-rim 50, the latter forming one of the elements of the planetary gearing mounted upon and surrounding the shaft 6, and which are adapted to coöperate to drive said shaft in a manner to be hereinafter fully described.

The sleeve 7 has no other function than to incase the right-hand end of the shaft 6, and does not project outwardly from the right-hand bearing 105 as does the inclosed end of said shaft. The right-hand projecting end of the shaft 6 may have a carrying-wheel directly secured upon it. The left-hand sleeve 8, however, does project to the left of the left-hand bearing 105, and is adapted to have the left-hand carrying-wheel secured to it. The shaft 6 thus extends from bearing to bearing, while a differential gearing drives the shaft and the sleeve 8 in a well-known way.

The differential-gearing may be as shown, and composed of the opposed bevel-gear-wheels 57 and 59 having a plurality of intermediately located bevel-pinions, such as are shown at 55, 56 and 61 intermeshed with both. The gear-wheel 59 is secured to the sleeve 8 by machine-screws 60, and is rotatable about the shaft 6 with said sleeve, while the gear-wheel 57 is fixedly secured to said shaft 6 by means of a key 58, and rotates with said shaft. The pinions are rotatable on studs 54, the latter extending from inner seats, and received in bearing-openings in a cylinder 53, the latter having its inner end closed by a disk 52 concentrically mounted on the shaft 6, rotatably. The disk 52 has on its right-hand face a number of stud-pivot-shafts 80 upon which are rotatably mounted the gear-wheels 78, the latter having projected from their right-hand sides integral pinions 79. Abutments 73 are secured to the right-hand face of the disk 52 by means of screws 63, said abutments having projections 74 which extend over the edges of the rings 51, to hold the latter in position concentrically about the outer edge of said disk. The sprocket-rim 50 is secured to the right-hand face of the ring 51 by means of screws 62. The inner edge of the rim 50 has internal-gear teeth 81 which are in mesh with the teeth of the gear-wheels 78. A friction-drum 13 is seated about said shaft 6 immediately to the right of the rim 50 and bears against the latter, and has an inwardly-directed flange to which a gear-rim 75 is secured by means of screws 76. The internally directed teeth of the rim 75 are enmeshed with the teeth of the pinions 79. A friction-drum 11 is seated immediately to the right of the friction-drum 13, and is carried by a sleeve 71, the latter extending to the left and having on its left-hand end a gear-wheel 72 integral with it and whose teeth are intermeshed with the teeth of said pinions 79. The sleeve 71 is concentrically seated movably on a sleeve 85, the latter being concentrically and movably seated on the shaft 6, and said sleeve 85 has an integral gear-wheel 84 on its left-hand end, whose teeth intermesh with the teeth of the surrounding gear-wheels 78. The right-hand end of the sleeve 85 carries the friction-drum 9, the latter being located immediately to the right of the friction-drum 11, the drum being connected to said sleeve by means of the radial spokes 70, the latter being so formed and arranged as to lie at the left-hand edge of said drum and project largely into the hollow of the adjacent drum 11. The spokes 70 are each radially slotted to provide seats for the levers 68, the latter being pivoted to said spokes at 69. Each lever 68 has an outwardly-directed friction head which is located adjacent to the inner face of the drum 11 and is adapted to frictionally bear against said drum when the right-hand part of the lever is moved in a certain direction. The right-hand end of each lever 68 is split or forked, and on a pintle 67 connecting such forks one end of a link 22 is pivotally mounted, the bearing opening 66 in said link being elongated to permit of some play between the parts. The other end of each link 22 is enlarged and squared to form a shoulder about it, a coiled compression-spring 23 being seated about the link between the shoulder and the brake. The squared end of each link is pivoted on a pintle 21 extending across the forks 24 projecting to the right from the collar 18, the latter being slidably seated on said shaft 6 and provided with a peripheral groove 19 adapted to receive the prongs of a shifting-fork 20. The drum 13 as well as the drum 11 are held in place on the shaft 6, by means of a disk 65 seated on the sleeve 71, and secured to the abutment 73 by means of screws 64.

Referring to Fig. 1, it will be seen that the shifting-fork 20 is secured to both of the arms 25 and 29, the two latter arms forming a two-part bearing movable on said fixed shaft 5, being slidable therealong to carry likewise the fork 20 and the collar 18 slidably along the sleeve 7 without sidewise vibrations. 27 is a bar fixed at its outer end to the adjacent frame-bar 1 by means of a bolt 28, said bar 27 having a pivotal connection at its inner end with one end of a bell-crank lever 26, to provide a fulcrum for the latter. The other end of the lever 26 is pivoted to one end of the shifting-rod 31, and said lever is also medially pivoted to said arm 25. When the rod is moved back and forward it thereby shifts the collar 18 to and fro along the sleeve 7, causing the friction-heads 68 to engage or become disengaged from the inner wall of the friction-drum 11.

Referring to Fig. 4, it will be seen that cams 42, 43 and 44 are fixed to the rock-shaft 2. The cams 44, 43 and 42 are respectively used in turn to regulate and vary the speed of the device, being adjusted respectively for low, intermediate, and high speeds forward. Rock-levers 38, 39 and 40 are mounted on the shaft 3 to rock separately thereon, and are in the form of bell-cranks with bifurcated upper and lower ends, anti-friction rollers 41 and 86 being mounted in the said bifurcations respectively on the cross-pintles 98 and 99 respectively. The angles of the rock-levers are turned forwardly so as to locate the rollers 41 and 86 so as to bear against the edges of said cams. The lower forks of said bifurcations have at their ends the pintles 87 on which are pivotally mounted the forward ends of the shifting-rods 31, 32 and 33. Secured also to the rock-shaft 2 to the left hand of said cams is a sleeve 45 having a projecting arm 46 extending upwardly, and also an arm 88 extending downwardly. A cylindrical body 47 has its forward end pivoted at 100 to the lower end of the arm 88, said body being centrally and longitudinally hollowed to receive movably the forward end of a shifting-rod 34. The said body has a longitudinal slot 49 along its upper side in communication with the central hollow, and a pin 48 projects upwardly from the rod 34 through said slot, and serves to limit the play of said rod within said hollow.

On the fixed shaft 5 are a plurality of rock-sleeves 17, which have spaced apart arms 106. These arms have pintles 107 and 92. On the pintle 92 in each case is medially pivoted paired and connected bell-cranks 16, whose lower ends are connected by the pintle 91 in each case. To the pintles 91 are pivoted the rear ends of the shifting-rods 32, 33 and 34. The bell-crank lever 89 pivoted to the rod 34 is the same in form and function as the levers 16, but has a longer lower limb to equalize the throw of the rod caused by the movement of the parts connected between it and the sleeve 45. The ends of the band-brakes 10, 12 and 14 are pivotally connected to the upper pintles 90 of the levers 16 and 89 respectively, and to the pintles 107 in the extremities of the arms 106. The shifting forward of either of the rods 32, 33 or 34 has the effect of tightening the band-brakes in turn connected thereto as desired. The effect of shifting forward the rod 31 is to slide the collar 18 toward the drum 9, which causes the friction-heads 68 to engage the inner periphery of the drum 11, causing the drums 9 and 11 to act as one.

When the band-brake 12 is tightened by reason of moving the hand-lever 46 ahead to the first position ahead of the neutral positions of the cams, Fig. 4 showing all of the cams in their neutral positions with the band-brakes loosened from the drums, the band-brake holds the drum 11 still with its pinion 72. The sprocket-rim 50 is rotated in the direction of the arrow shown in Fig. 3, and the included gearing acts to communicate a slow speed of rotation to the sleeve 8 and the shaft 6, which latter move together as one except when the carrying-wheels are effecting a differential movement between such shaft and sleeve. When the lever 46 is thrown forward to its second position, the wiper 94 on the cam 44 releases the roller and its lever 40 contacting therewith and the brake 12 is loosened, the wiper 93 on the cam 43 then drawing back the lever 39 and tightening the band-brake 10 on the friction-drum 9. This holds still the pinion 84 of said drum, and the action of the gearing on the shaft is to increase its speed forward. When the lever 46 is shifted ahead one more position the wiper 93 releases the lever 39, thus loosening the brake 10, while wiper 95 on the cam 42 acts to move the lever 38 and draw upon the rod 31, thus shifting the collar 18 toward the adjacent drum 9, and causing the friction-heads 68 to set against the drum 11, thus holding both drums still with their pinions 84 and 72. The shaft 6 is then driven at the third or highest speed forward. When the lever 46 is shifted backward, the arm 88 is moved forward until the rear collar of the slideway 47 engages the pin 48 on the rod 34, when said rod is also moved forward, which causes its connections to tighten the band-brake 14 upon the drum 13. The stopping of the drum obviously so varies the interaction of the internal-gearing as to reverse the rotation of the shaft 6, and said shaft is driven backward. The shifting forward of the lever 46 then brings all the cams to their neutral position as shown, and the band-brakes as well as the friction-heads 68 are loosened, causing a cessation of rotation of said shaft.

In Figs. 5, 6 and 7 are shown a power transmission device similar in form and principle to that described above, but being adapted for but two speeds forward, and intended for use on tractors. In this form of the device, the low and high speed cams 43 and 42 act upon the band-brake 10 and the slide-collar 18 in a similar manner to the first-mentioned device, the brake 10 acting on the drum 83, and the friction-heads 68 upon both the drums 83 and 84 to hold them together. The band-brake 14 reverses the device in a similar manner by acting alone on the drum 82, the latter being analogous to the drum 13.

The arrangement of internal-gearing is such as to act with ease and responsively in practice.

Having described my invention, what I claim as new, and desire to secure by Letters Patent, is:

1. A power transmission device, comprising, in combination, a frame, a rotary shaft mounted in said frame, a disk mounted on said shaft, a sprocket-rim rotatably mounted about said disk and having an internal-gear, a plurality of gear-wheels arranged about said shaft and rotatably mounted on stud-shafts projecting from one face of said disk and in mesh with said internal-gear of said sprocket-rim, each of said gear-wheels having an integral coaxial pinion rotatable with it on the same stud-shaft, a hollow friction-drum having an internal gear-wheel integral therewith and in mesh with said plurality of pinions, a second hollow friction-drum having an integral gear-wheel in mesh with said plurality of pinions, a third friction-drum rotatably mounted on said shaft and having an integral pinion in mesh with said plurality of gear-wheels, friction-heads pivoted to the third friction-drum and engaging the inner periphery of said second friction-drum, means for shifting said friction-heads in and out of frictional contact with said second drum, a band-brake about each of said first, second and third friction-drums, and means for independently tightening said band-brakes upon said drums.

2. A power transmission device, comprising, in combination, a frame, a rotary shaft mounted in said frame, a disk operatively mounted on said shaft, a sprocket-rim rotatably mounted about said disk and having an internal-gear, a plurality of gear-wheels arranged about said shaft and rotatably mounted on stud-shafts projecting from one face of said disk and in mesh with said internal-gear, each of said gear-wheels having an integral coaxial pinion, and a plurality of drums arranged side-by-side on said shaft rotatably, and respectively geared with said plurality of gear-wheels and pinions independently, a movable brake adapted to independently frictionally contact with the outer periphery of each of said drums, to separately stop the rotation of either as desired, and a friction-head pivotally connected to one of said drums and adapted to frictionally engage another of said drums to connect the two drums together.

3. A power transmission device, comprising, in combination, a frame, a rotary shaft mounted in said frame, a sprocket- or gear-rim rotatably mounted about and spaced away from said shaft concentrically, said rim having an internal-gear, a plurality of gear-wheels rotatable on shafts, the latter fixed in relation to said first-mentioned shaft, and said wheels having integral coaxial pinions, a gear-wheel rotatable on said shaft and meshed with all of said plurality of gear-wheels, means for holding the last-mentioned gear-wheel fixed when desired, an internal-gear wheel in mesh with said plurality of pinions, means for holding the last-mentioned internal-gear wheel fixed when desired, a gear-rim concentric with said first-mentioned shaft and rotatable about it and in mesh with said plurality of pinions, and means for holding said last mentioned gear-rim fixed when desired.

4. A power transmission device, comprising, in combination, a frame, a rotary shaft mounted in said frame, a sprocket- or gear-rim rotatably mounted about and spaced away from said shaft concentrically, said rim having an internal-gear, a plurality of gear-wheels rotatable on shafts, the latter fixed in relation to said first-mentioned shaft, and said wheels having integral coaxial pinions, a gear-wheel rotatable on said shaft and meshed with all of said plurality of gear-wheels, means for holding the last-mentioned gear-wheel fixed when desired, an internal-gear wheel in mesh with said plurality of pinions, means for holding the last-mentioned internal-gear wheel fixed when desired, a gear-rim concentric with said first-mentioned shaft and rotatable about it and in mesh with said plurality of pinions, means for holding the last-mentioned gear-rim fixed when desired, and independent means for connecting together both the gear-wheel in mesh with said plurality of gear-wheels and the gear-wheels in mesh with said plurality of pinions.

5. A power transmission device, comprising, in combination, a frame, a rotary shaft mounted in said frame, a sprocket- or gear-rim rotatably mounted about and spaced away from said shaft concentrically, said rim having internal-gear shafts, a plurality of gear-wheels rotatable on said shafts, the latter fixed in relation to said first-mentioned shaft, and said wheels having integral coaxial pinions, a gear-wheel rotatable on said shaft and meshed with said plurality of gear-wheels, means for holding said last-mentioned gear-wheel immovable when desired, an internal-gear wheel in mesh with said plurality of pinions, and means for holding said internal-gear wheel immovable when desired.

6. A power transmission device comprising, in combination, a frame, a rotary shaft mounted in said frame, a sprocket- or gear-rim rotatably mounted about and spaced away from said shaft concentrically, said rim having internal-gear shafts, a plurality of gear-wheels rotatable on said shafts, the latter fixed in relation to said first-mentioned shaft, and said wheels having coaxial integral pinions, a gear-wheel rotatable on said shaft and meshed with said plurality of gear-wheels, means for holding said last-mentioned gear-wheel immovable when desired, an internal-gear wheel in mesh with said plurality of pinions, means for holding said internal-gear wheel immovable when desired, and means for independently locking said gear-wheel which is in mesh with said plurality of gear-wheels and said internal-gear wheel which is in mesh with said plurality of pinions together.

Signed at Waterloo, Iowa, this 8th day of Aug. 1910.

DALTON K. WILSON.

Witnesses:
O. D. YOUNG,
G. C. KENNEDY.